Dec. 20, 1927.  
A. RAPP  
1,653,228  
SEEDER  
Filed Feb. 27, 1926
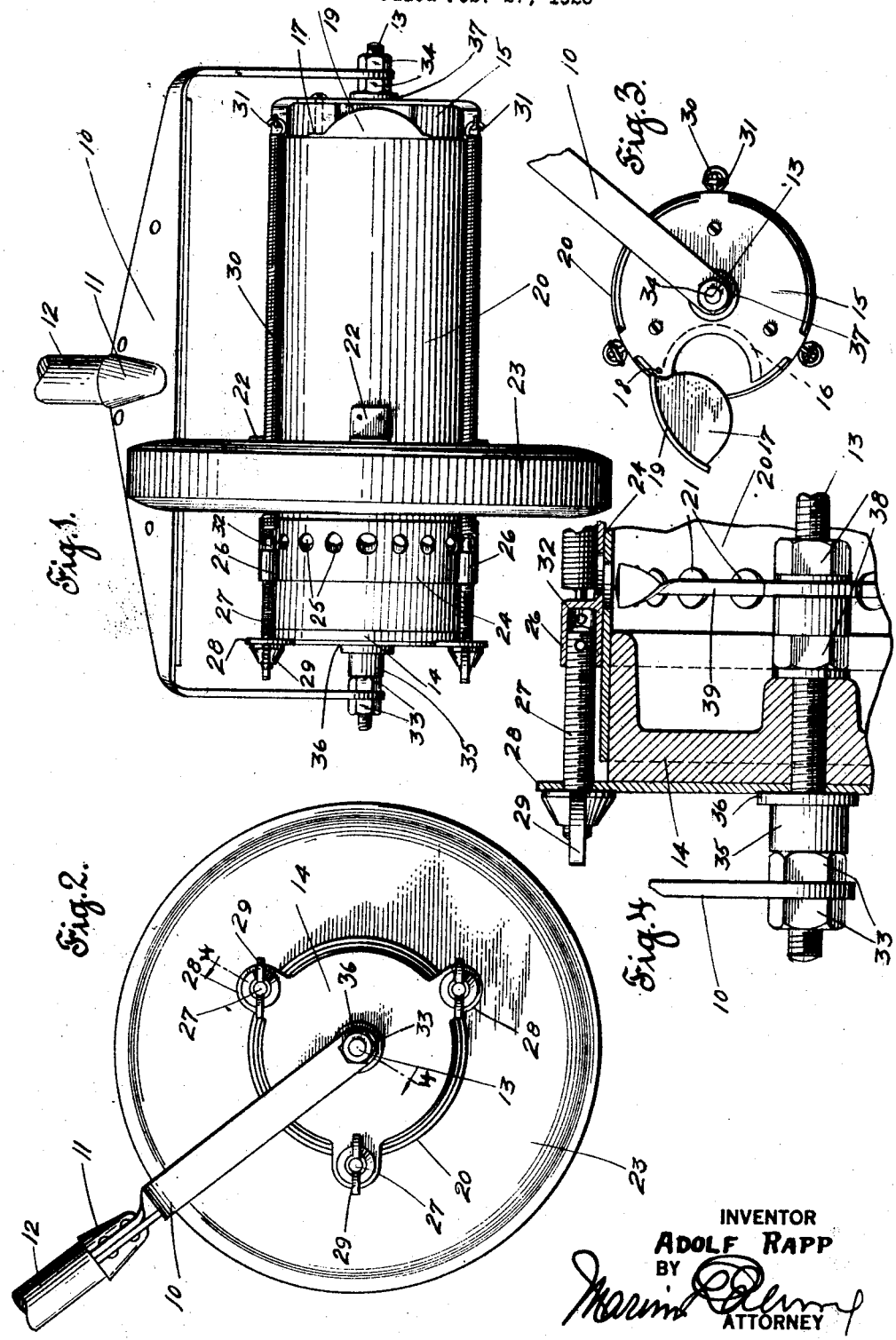
INVENTOR  
ADOLF RAPP  
BY  
ATTORNEY Patented Dec. 20, 1927.

1,653,228

UNITED STATES PATENT OFFICE.

ADOLF RAPP, OF BROOKLYN, NEW YORK.

SEEDER.

Application filed February 27, 1926. Serial No. 91,067.

This invention relates to devices used to spread seeds for planting over a plowed field and more particularly to devices of this type that are manually operable.

One of the objects of the invention is in the provision of means whereby the amount of seed being dispensed is easily and quickly regulated.

A further feature of the device is to provide means to keep the dispensing passage clear and free from clogging.

These and other objects are accomplished by the novel construction, combination and arrangement of parts hereinafter described and illustrated in the accompanying drawing, in which:—

Figure 1 is a front elevational view of the preferred embodiment of the invention.

Figure 2 is an end view thereof.

Figure 3 is a fragmentary end view looking from the right side of Figure 1.

Figure 4 is a fragmentary sectional view drawn to an enlarged scale taken on line 4—4 of Figure 2.

Referring more in detail to the drawing:—

Formed with a U-shaped frame 10 is a socket 11 to receive a handle 12. Mounted between the arms of the frame 10 is a threaded rod 13 on which is a rotatable circular block 14 at one end and another similar block 15 at the other end, a portion in the outer periphery of which is cut away to form an opening grooved as at 16.

The groove is receptive of the edge of a cover 17 attached by a pivot 18 adjacent the opening to the block 15. The outer edge of the cover is bent at right angles to form a grip 19 by which the same is opened or closed.

Fitting snugly over the blocks 14 and 15 is a cylindrical casing 20 near one end of which is a plurality of uniformly spaced openings 21. Rigidly mounted on the casing 20 are brackets 22 to which is fixed a wheel 23.

Slidably mounted on the casing 20 is a sleeve 24 having openings 25 coincident with the openings 21 of the casing 20 and threaded sockets 26 in which are fixed threaded rods 27.

Formed on the block 14 are projections 28 through which the rods 27 pass and are engaged by wing nuts 29. On the outside of the casing 20 in a line with the threaded rods 27 and passing through the wheel 23 are coil springs 30 anchored at one end on the block 15, as at 31 and fixed at the other end to the sockets 26, as at 32, thus tending to draw the sleeve 24 to the right and keeping the holes 21 closed.

The rod 13 is prevented from becoming disengaged from the frame 10 by pairs of nuts 33 and 34, one of each pair being fixed on each side of the arms of the frame.

Between the inner nut 33 and the block 14 is a bushing and a washer 35 and 36 respectively. Between the inner nut 34 and the block 15 is a washer 37.

Mounted on the rod 13 within the casing 20 and fixed so as to pass over the opening 21 by nuts 38 is a wiper 39 which while revolving keeps the openings 21 clear to allow free dispensing of the seeds contained in the casing 20, should the seeds through moisture, adhere to the surfaces adjacent the openings 21 thereby clogging the same.

In operation, the cover 17 is opened by grasping the grip 19 pulling so as to pivot on 18. Seeds are poured into the casing 20 and the cover is closed.

According to the size and amount of seed to be dispensed the openings 21 are made larger or smaller as the case may be. This is done by turning the wing nuts 29. If the openings are to be made larger, the wing nuts are turned to the left. This allows the springs 30 to draw the sleeve 24 to the right, thus bringing the holes 21 of the casing 20 and the holes 25 of the sleeve 24 nearer to coincidency. If the openings are to be made smaller, the wing nuts 29 are turned to the right, thus drawing the sleeve 24 to the left pulling against the action of the springs 30 and closing the openings.

Having thus described my invention, what I claim as new and desire to secure by Letters Patent, is:—

A seeder comprising a frame, a rod in said frame, blocks on said rod, one of said blocks having an opening and a cover therefor, a casing having circular openings mounted over said blocks, a sleeve, having similar openings, in register with said casing openings, longitudinally slidable on said sleeve, sockets on said sleeve threaded rods in said sockets passing through projections on one of said blocks, and tension springs intermediate the other of said blocks and said sockets.

In witness whereof I have affixed my signature.

ADOLF RAPP.